United States Patent
Riche et al.

(10) Patent No.: US 10,216,495 B2
(45) Date of Patent: *Feb. 26, 2019

(54) PROGRAM VARIABLE CONVERGENCE ANALYSIS

(71) Applicant: NATIONAL INSTRUMENTS CORPORATION, Austin, TX (US)

(72) Inventors: Taylor L. Riche, Austin, TX (US);
Newton G. Petersen, Emporia, KS (US); Hojin Kee, Austin, TX (US);
Adam T. Arnesen, Pflugerville, TX (US); Haoran Yi, Austin, TX (US);
Dustyn K. Blasig, Pflugerville, TX (US); Tai A. Ly, Austin, TX (US)

(73) Assignee: NATIONAL INSTRUMENTS CORPORATION, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/886,390

(22) Filed: Feb. 1, 2018

(65) Prior Publication Data
US 2018/0181379 A1 Jun. 28, 2018

Related U.S. Application Data

(63) Continuation of application No. 14/883,449, filed on Oct. 14, 2015, now Pat. No. 9,921,815, which is a
(Continued)

(51) Int. Cl.
*G06F 8/41* (2018.01)

(52) U.S. Cl.
CPC .............. *G06F 8/433* (2013.01); *G06F 8/443* (2013.01)

(58) Field of Classification Search
CPC ........................................................ G06F 8/433
(Continued)

(56) References Cited

U.S. PATENT DOCUMENTS

| 5,740,446 A | 4/1998 | Fujiwara |
| 7,401,056 B2 | 7/2008 | Kam |

(Continued)

OTHER PUBLICATIONS

Trelea, Ioan Cristian. "The particle swarm optimization algorithm: convergence analysis and parameter selection." Information processing letters 85.6 (2003): pp. 317-325. (Year: 2003).*

(Continued)

*Primary Examiner* — Satish Rampuria
(74) *Attorney, Agent, or Firm* — Meyertons Hood Kivlin Kowert and Goetzel PC; Jeffrey C. Hood

(57) ABSTRACT

System and method for convergence analysis. One or more state variables of a first program may be determined based on dependencies of variables in a first program. A second program corresponding to the first program is created based on the state variables and their dependencies, and executed multiple times. Each execution may include recording values of the state variables, determining an execution count, comparing the values to corresponding values from previous executions of the second program, and terminating the executing in response to the values matching corresponding values from at least one previous execution of the second program. A convergence property for the first program is determined based on the execution count, and indicating a number of executions of the first program required to generate all possible values of the one or more variables. The convergence property is stored, and may be useable to optimize the first program.

18 Claims, 9 Drawing Sheets

Related U.S. Application Data continuation of application No. 14/468,935, filed on Aug. 25, 2014, now Pat. No. 9,189,215.

(58) Field of Classification Search
USPC .................................................. 717/100–167
See application file for complete search history.

(56) References Cited

U.S. PATENT DOCUMENTS

| | | | |
|---|---|---|---|
| 7,480,881 | B2 | 1/2009 | Tetelbaum |
| 7,496,485 | B2 | 2/2009 | Elfadel |
| 7,712,093 | B1 | 5/2010 | Foley |
| 7,840,949 | B2* | 11/2010 | Schumacher ............ G06F 8/10 710/71 |
| 8,429,631 | B2* | 4/2013 | Schumacher ............ G06F 8/10 717/138 |
| 8,443,316 | B1 | 5/2013 | Biswas |
| 8,793,674 | B2 | 7/2014 | Ravi |
| 9,134,979 | B2 | 9/2015 | Kudlur |
| 9,292,265 | B2 | 3/2016 | Grover |
| 2008/0052271 | A1 | 2/2008 | Lam |
| 2008/0052687 | A1* | 2/2008 | Gonzales-Tuchmann ................... G06F 8/10 717/140 |
| 2013/0097593 | A1* | 4/2013 | Ravi ............ G06F 8/443 717/158 |
| 2014/0223420 | A1* | 8/2014 | Kudlur ................ G06F 8/4451 717/156 |

OTHER PUBLICATIONS

Rudolph, Günter. "Convergence analysis of canonical genetic algorithms." IEEE transactions on neural networks 5.1 (1994): pp. 96-101. (Year: 1994).*

Ljung, Lennart. "Convergence analysis of parametric identification methods." IEEE transactions on automatic control 23.5 (1978): pp. 770-783. (Year: 1978).*

Van der Tak: "A computer program for fast non-LTE analysis of interstellar line spectra with diagnostic plots to interpret observed line intensity ratios"—Astronomy & Astrophysics, vol. 468.2, 2007, pp. 627-635 + appendix. (14 pages).

Lorenzo-Seva, et al.: "Factor: A computer program to fit the exploratory factor analysis model"—Behavior Research Methods 38.1, 2006, pp. 88-91; Phychonomic Society, Inc. (4 pages).

Finkel, Daniel E. and C. T. Kelley: "Convergence Analysis of the Direct Algorithm"—Optimization Online: Jul. 14, 2004; pp. 1-10; North Carolina State University, Center for Research in Scientific Computation and Department of Mathematics, Raleigh, North Carolina, U.S.A. (10 pages).

Beyer, Dirk, Thomas A. Henzinger, and Gregory Theoduloz: "Configurable Software Verification: Concretizing the Convergence of Model Checking and Program Analysis"—Computer Aided Verification (CAV) 2007, LNCS 4590, pp. 504-518; Springer-Verlag Berlin Heidelberg, Germany. (15 pages).

Luo, Zhi-Quan, and Paul Tseng: "Error bounds and convergence analysis of feasible descent methods: a general approach"—Annals of Operations Research, vol. 46, Mar. 1993; pp. 157-178. (22 pages).

\* cited by examiner exemplary first program exemplary second program

PROGRAM VARIABLE CONVERGENCE ANALYSIS

CONTINUATION DATA

This application is a continuation of U.S. application Ser. No. 14/883,449, titled "Convergence Analysis of Program Variables", filed Oct. 14, 2015, whose inventors are Taylor L. Riche, Newton G. Petersen, Hojin Kee, Adam T. Arnesen, Haoran Yi, Dustyn K. Blasig, and Tai A. Ly, which is a continuation of U.S. application Ser. No. 14/468,935, titled "Convergence Analysis of Program Variables", filed Aug. 26, 2014, now issued U.S. Pat. No. 9,189,215, issued Nov. 17, 2015, whose inventors are Taylor L. Riche, Newton G. Petersen, Hojin Kee, Adam T. Arnesen, Haoran Yi, Dustyn K. Blasig, and Tai A. Ly. Both of which are fully incorporated by reference herein.

FIELD OF THE INVENTION

The present invention relates to the field of program optimization, and more particularly to a system and method for convergence analysis of program variables.

DESCRIPTION OF THE RELATED ART

In the compilation of programs, certain optimizations that depend on knowing all possible values (which may be referred to herein as APV, for convenience) of certain variables may be applied. For example, if one knows all possible values of a variable are positive, then its data type may be changed to be UNSIGNED. As another example, if one knows that all possible values of a variable do not overlap those of a second variable, then any equality comparison between these two variables may be replaced by the constant FALSE.

Note that "all possible values" of a variable is different from its "range". The range of a variable specifies its minimum and maximum values, and is a super set of all possible values of the variable, is not the same. For example, all possible values of a first variable may be even, all possible values of a second variable may be odd, and while these two variables may have overlapping ranges, their "all possible values" are non-overlapping.

One way to determine all possible values of one or more variables in a program is to execute the program a number of times and collect actual values assigned to each of these variables during these executions. As used herein, the term "convergence number" refers to the number of times a program must be executed in order to collect all possible values for a particular set of variables. If the convergence number N exists for a specified set of variables in a program, the program may be executed N times, and all actual values assigned to each of the variables collected over the N executions to determine their APVs, thereby enabling optimizations that depend on them.

However, determining whether such a convergence number (or more generally, a convergence property) exists for a given set of program variables, and if so, its value, can be problematic and error prone.

Graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

SUMMARY OF THE INVENTION

Various embodiments of a system and method for convergence analysis of program variables are presented below.

One or more state variables of a first program may be determined based on dependencies of one or more variables in the first program. As used herein, the term "state variable" refers to variables that carry (e.g., preserve or maintain) state from one call of a program to another call of the program. Thus, for example, in the C programming language these are global and static variables; in the LabVIEW™ graphical programming system (i.e., the G programming language) state variables include "feedback" and "feed forward" nodes; and in hardware, state variables are memories. Note that "feedback variables" (or nodes) are those variables that are dependent on themselves, i.e., that are dependent upon previous values of themselves, e.g., x=x+1, or more generally, $\{x,y\}$=(or :=, meaning "is assigned") function(x, y), where x and y are variables that (somehow) depend on one another. Thus, state variables are different from normal variables in that their "lifetime" is longer than a single execution of the program in which they are used.

The first program may be any of a variety of program types, e.g., one or more of: a data flow program, a graphical program, a graphical data flow program, or a hardware description program, among others. As further examples, in some embodiments, the first program may be or include one or more of: a procedural program, a functional program, a textual program, or a declarative program. Additionally, it should be noted that the one or more variables upon whose dependencies the state variables are (at least partially) determined may be of various kinds. For example, the one or more variables may include one or more of: at least one variable in at least one array indexing expression for an array in the first program, at least one set of variables that is dependent upon itself, or at least one variable whose value is set by an operation that includes input or output range properties to be optimized. In various embodiments, the one or more variables may have data types including one or more of: scalar, array, or heterogeneous data structure (i.e., with elements of different data types), which may also be referred to as a cluster.

The dependencies (of the one or more variables) may include one or more of: a data dependency through variable assignment, a control dependency through control structures, or a transitive closure of a data or control dependency, among others. The one or more state variables may include one or more of: at least one static variable, at least one global variable, at least one feedback node in a dataflow language, at least one modal parameter, or at least one parameter that takes on one of a plurality of values throughout execution of the first program.

Thus, a wide variety of first programs, variables, dependencies, and state variables are contemplated.

A second program corresponding to the first program may be created based on the one or more state variables and dependencies of the one or more state variables. In various embodiments, the second program may have any of a variety of forms (or combinations of such forms). For example, in one embodiment, the second program may be smaller than the first program. In another embodiment, the second program may be a program that executes faster than the first program. In a further embodiment, the second program may be an empty program with no state variables. In a yet further embodiment, the second program may be the same as the first program. More generally, the second program may be or include one or more of: smaller than the first program, a program that executes faster than the first program, an empty program with no state variables, or the same as the first program.

The second program may be executed a plurality of times. For each execution, the method may perform: recording values of the one or more state variables, determining an execution count, comparing the values to corresponding values from previous executions of the second program, and terminating said executing in response to determining that the values match corresponding values from at least one previous execution of the second program. Note that in some embodiments, a stopping condition, e.g., an execution count threshold or other stopping condition may be specified, and if matching values are not found before the stopping condition obtains, the iterative executions may terminate with a null result (and the method may indicate this null result to the user, e.g., on the display, in a log file, etc.).

Recording values of the one or more state variables may include one or more of: collecting unique values assigned to each variable, or collecting one or more derivative properties for values assigned to each variable, e.g., storing maximum and/or minimum value so far, average values, variance, etc.

In one embodiment, the above determining of one or more state variables, the creating, and the executing may be performed as part of compiling the first program. Moreover, in various embodiments, where executing the second program may include one or more of: running compiled code on a computer, where the compiled code is generated from at least a portion of the second program, interpreting program statements of at least a portion of the second program, or evaluating operations in a graph generated from at least a portion of the second program.

In one embodiment, the method may determine, based on the execution count, a convergence property for the first program that indicates a number of executions of the first program required to generate all possible values of the one or more variables, and the convergence property may be stored, e.g., in a memory medium. The convergence property may then be useable to optimize the first program, as discussed in more detail below.

The convergence property may be of any of a variety of forms, including, but not limited to, one or more of: a finite integer value, a real value, indicating a fractional execution of the program, an indication that there is no convergence, or a convergence property for each variable of at least a subset of variables in the first program (e.g., a set of convergence properties).

In one embodiment, the method may further include compiling the first program based on the convergence property, where the compiling includes generating code configured to run on one or more of: a desktop computer with one or more central processing unit (CPU) cores, an embedded computer with one or more CPU cores, a graphics processing unit (GPU), an embedded GPU, a field programmable gate array (FPGA), or an application specific integrated circuit (ASIC). Thus, any of a variety of execution platforms may be used as desired.

In some embodiments, the method may further include optimizing the first program based on the convergence property. Such optimizing may include, but is not limited to, one or more of: constant propagation and folding, range propagation and minimization, array size inference, dead code elimination, loop transformations, array transformations, memory optimization, inserting assertions (e.g., assumptions, or properties for testing purposes), inserting code coverage instrumentation, loop unrolling, in-lining of subprograms, out-lining of portions of programs, data type propagation and refinement, float to fixed data type conversion, optimization of overflow/quantization operations, type conversion insertion, or converting to look-up table implementations, among others.

BRIEF DESCRIPTION OF THE DRAWINGS

A better understanding of the present invention can be obtained when the following detailed description of the preferred embodiment is considered in conjunction with the following drawings, in which.

Figure 1A:
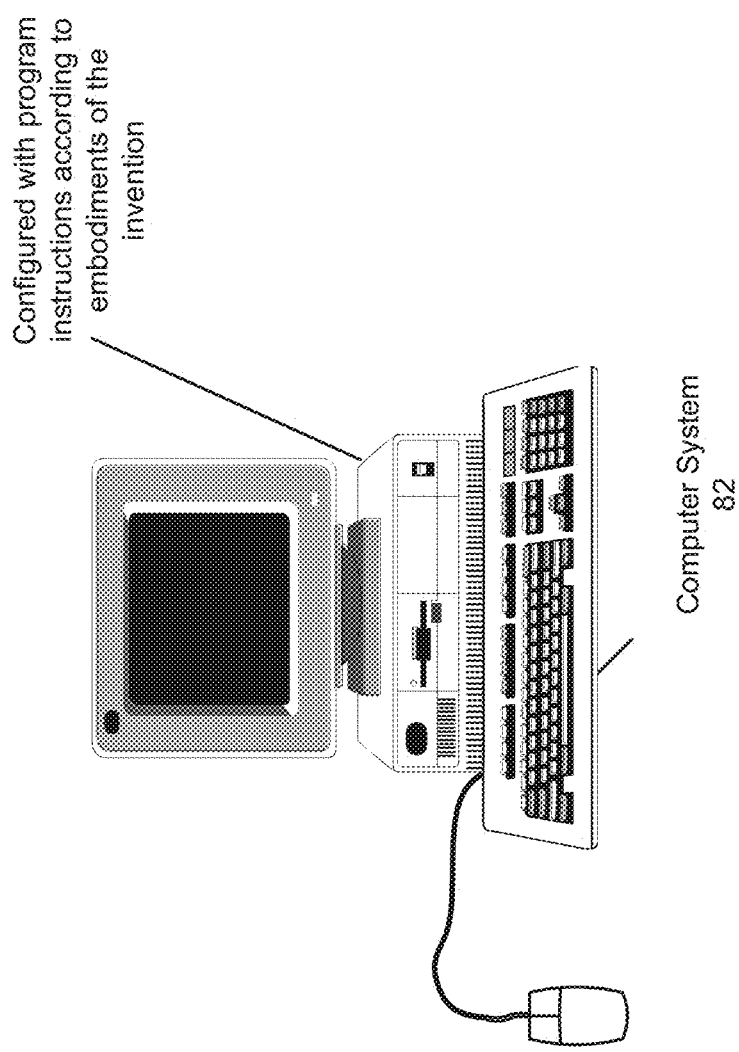
FIG. 1A illustrates a computer system configured to execute a graphical program according to an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 7,210,117 titled "System and Method for Programmatically Generating a Graphical Program in Response to Program Information," filed Dec. 20, 2000.

Terms

The following is a glossary of terms used in the present application:

Memory Medium—Any of various types of non-transitory computer accessible memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPGAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Graphical Program—A program comprising a plurality of interconnected nodes or icons, wherein the plurality of interconnected nodes or icons visually indicate functionality of the program. The interconnected nodes or icons are graphical source code for the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DIADem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Said another way, data flow programs execute according to a data flow model of computation under which program functions are scheduled for execution in response to their necessary input data becoming available. Data flow programs can be contrasted with procedural programs, which specify an execution flow of computations to be performed. As used herein "data flow" or "data flow programs" refer to "dynamically-scheduled data flow" and/or "statically-defined data flow".

Graphical Data Flow Program (or Graphical Data Flow Diagram)—A Graphical Program which is also a Data Flow Program. A Graphical Data Flow Program comprises a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Convergence Property—an indication of the number of times a program must be executed in order to collect all possible values for a particular set of variables. One particular example of a convergence property is a convergence number, which is thus the number of times the program must be executed in order to collect all possible values for a particular set of variables, e.g., array indices. Other forms of a convergence property may include multiple such numbers, e.g., for array indices of different arrays, or derivative values, e.g., maximum convergence numbers, etc., and so forth, as desired.

Compatible—refers to transforms that can operate on the same data without conflict. For example, consider array partitioning transforms after unrolling program loops, where the array partitions in these unrolled loops for the same arrays do not conflict with one another. For example, if one loop unroll would partition an array into two sub-arrays of equal sizes, and another loop unroll of a different loop would partition the same array into three sub-arrays of equal sizes, the partitions (two and three) are considered incompatible because a single array cannot simultaneously be partitioned into two and three arrays at the same time. In contrast, if the partition numbers are instead two and four, they are compatible because an array can be partitioned into two arrays of equal sizes, which can then each be partitioned into another two further sub-arrays of equal sizes, therefore making four sub-arrays of equal sizes. Thus, two effects (e.g., partition numbers) on the same data (in this case, partitioning the same array into two and into four sub-arrays) are compatible if one transform is a subset of another (partitioning into 4 arrays subsumes partitioning into two sub-arrays). Thus, this particular array partitioning is an example where "equality" of transforms (and their effects) is not required, but rather where one transform (and its effects) is "subsumed" by another transform (four is divisible by two).

Jamming Factor (of arrays)—in the context of program loop transformations, e.g., "unroll-and-jam" loop transformation that include loop unrolling followed by loop fusion, refers to the loop unrolling factor.

Array Remapping—refers to rewriting a program's array accesses as accesses to a second array of different dimension and/or data types. Note that there are more general versions of array remapping, but that important array remappings include cases where an N word by M bit array is rewritten into an N/2 by M*2 bit array, or N/4 by M*4 bit array. Thus, for example, a 100 word array of integers may be remapped into a 50 word array of longs (long integers), changing all array accesses accordingly).

FIG. 1A—Computer System

FIG. 1A illustrates a computer system 82 configured to implement embodiments of the present techniques.

As shown in FIG. 1A, the computer system 82 may include a display device configured to display a program, such as a graphical program, as the program is created, executed, or analyzed.

The display device may also be configured to display a graphical user interface, e.g., in embodiments where the program is a graphical program, a front panel, of the program during execution of the program. The graphical user interface may comprise any type of graphical user interface, e.g., depending on the computing platform.

The computer system 82 may include at least one memory medium on which one or more computer programs or software components according to embodiments of the present invention may be stored. For example, in some embodiments, the computer system may store one or more software tools configured to perform the convergence analysis techniques disclosed herein. For example, in some embodiments, the memory medium may store one or more graphical programs which are executable to perform the methods described herein. Additionally, the memory medium may store a graphical programming development environment application used to create and/or execute such graphical programs. In some embodiments, the software tool(s) may be incorporated in or integrated into the development environment. The memory medium may also store operating system software, as well as other software for operation of the computer system. Various embodiments further include receiving or storing instructions and/or data implemented in accordance with the foregoing description upon a carrier medium.

Figure 1B:
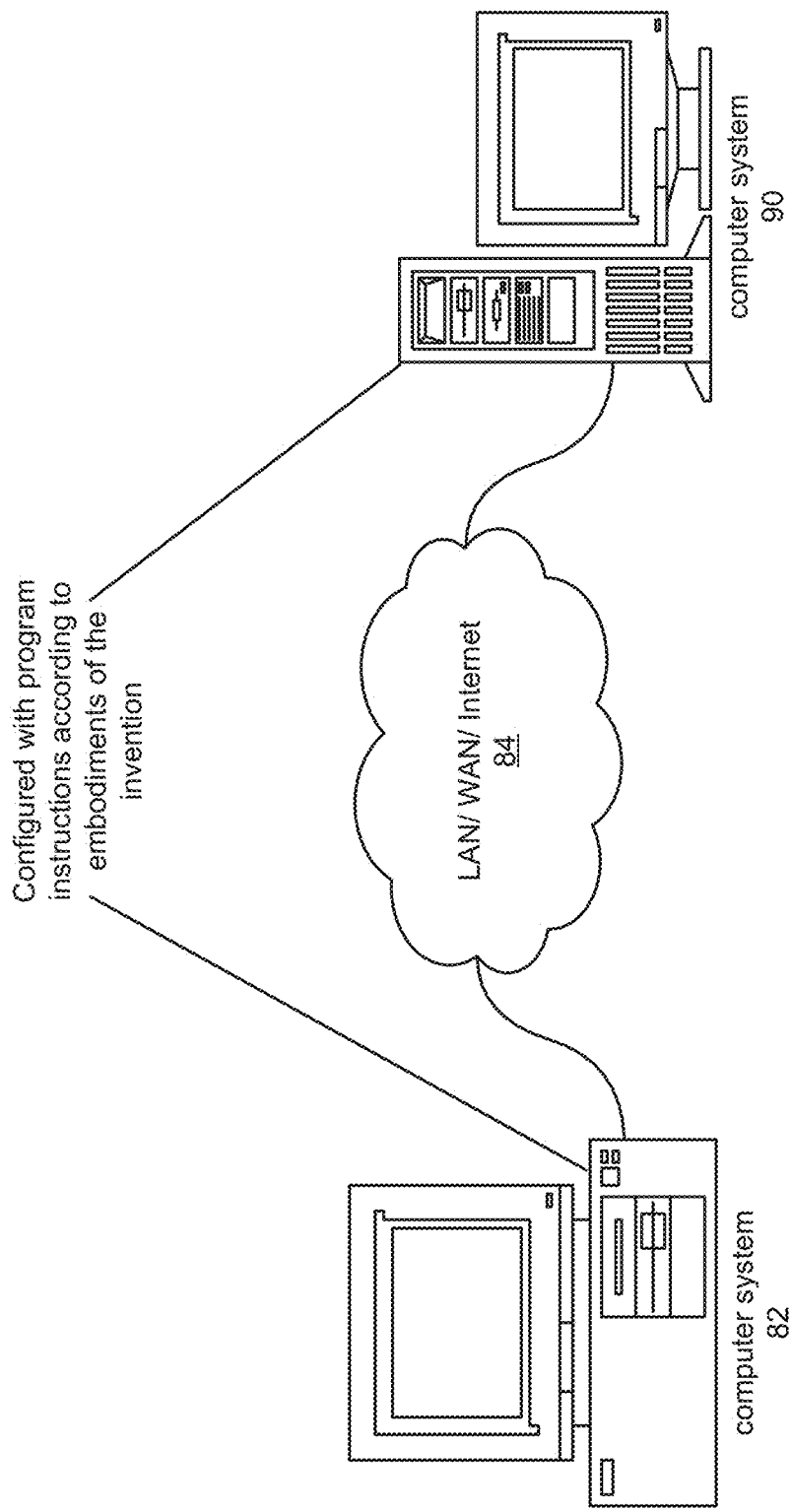
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may be configured to execute a graphical program in a distributed fashion. For example, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

In one embodiment, the graphical user interface of the graphical program may be displayed on a display device of the computer system 82, and the block diagram may execute on a device coupled to the computer system 82. The device may include a programmable hardware element and/or may include a processor and memory medium which may execute a real time operating system. In one embodiment, the graphical program may be downloaded and executed on the device. For example, an application development environment with which the graphical program is associated may provide support for downloading a graphical program for execution on the device in a real time system. Note, however, that in various embodiments, any type of program may be used or analyzed as desired, e.g., textual or graphical programs.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that embodiments of the present invention can be used for a plethora of applications and is not limited to the above applications. In other words, applications discussed in the present description are exemplary only, and embodiments of the present invention may be used in any of various types of systems. Thus, embodiments of the system and method of the present invention is configured to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
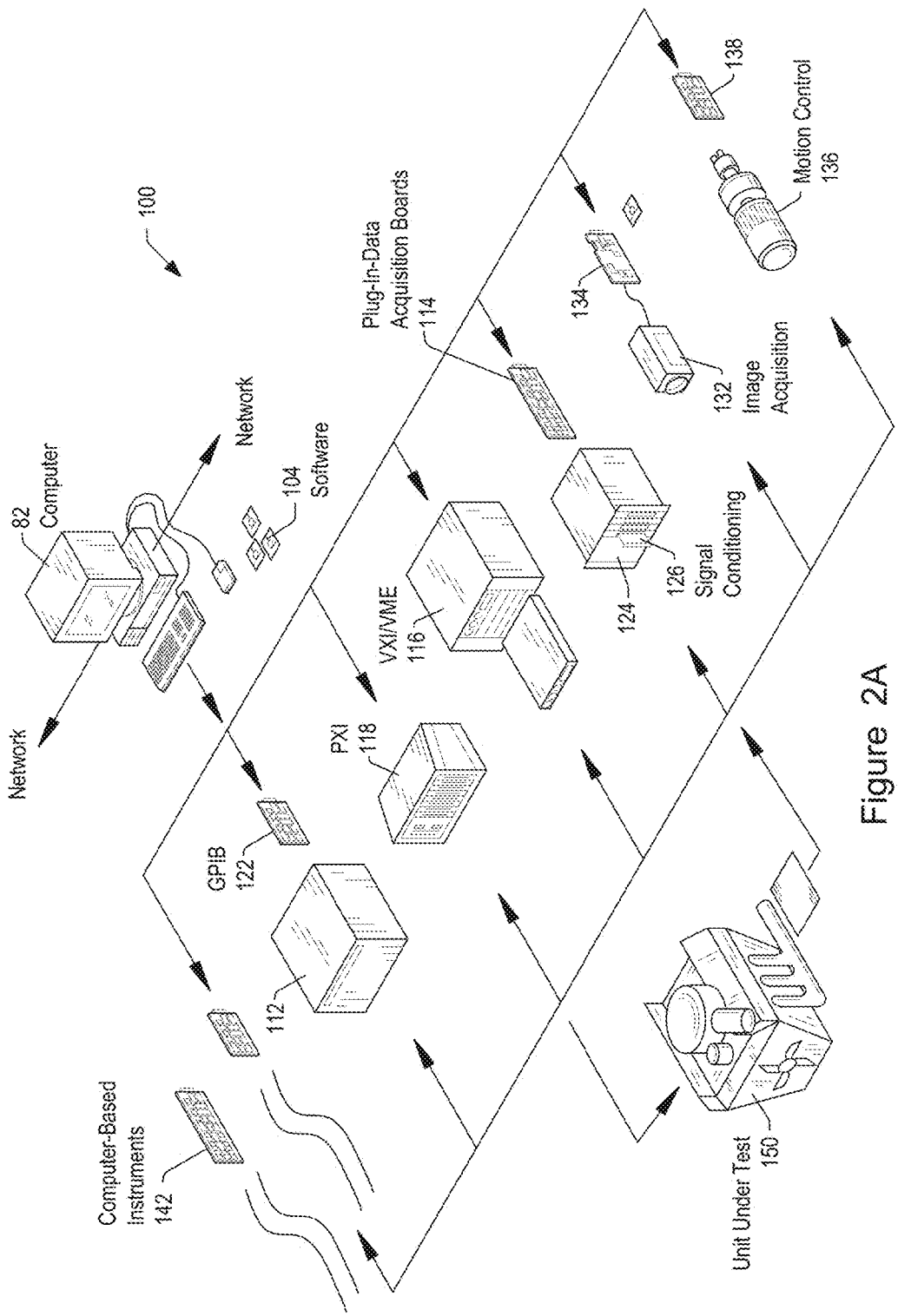
FIG. 2A illustrates an instrumentation control system according to one embodiment of the invention.

FIG. 2A illustrates an exemplary instrumentation control system 100 which may implement embodiments of the invention. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150, e.g., via execution of software 104.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
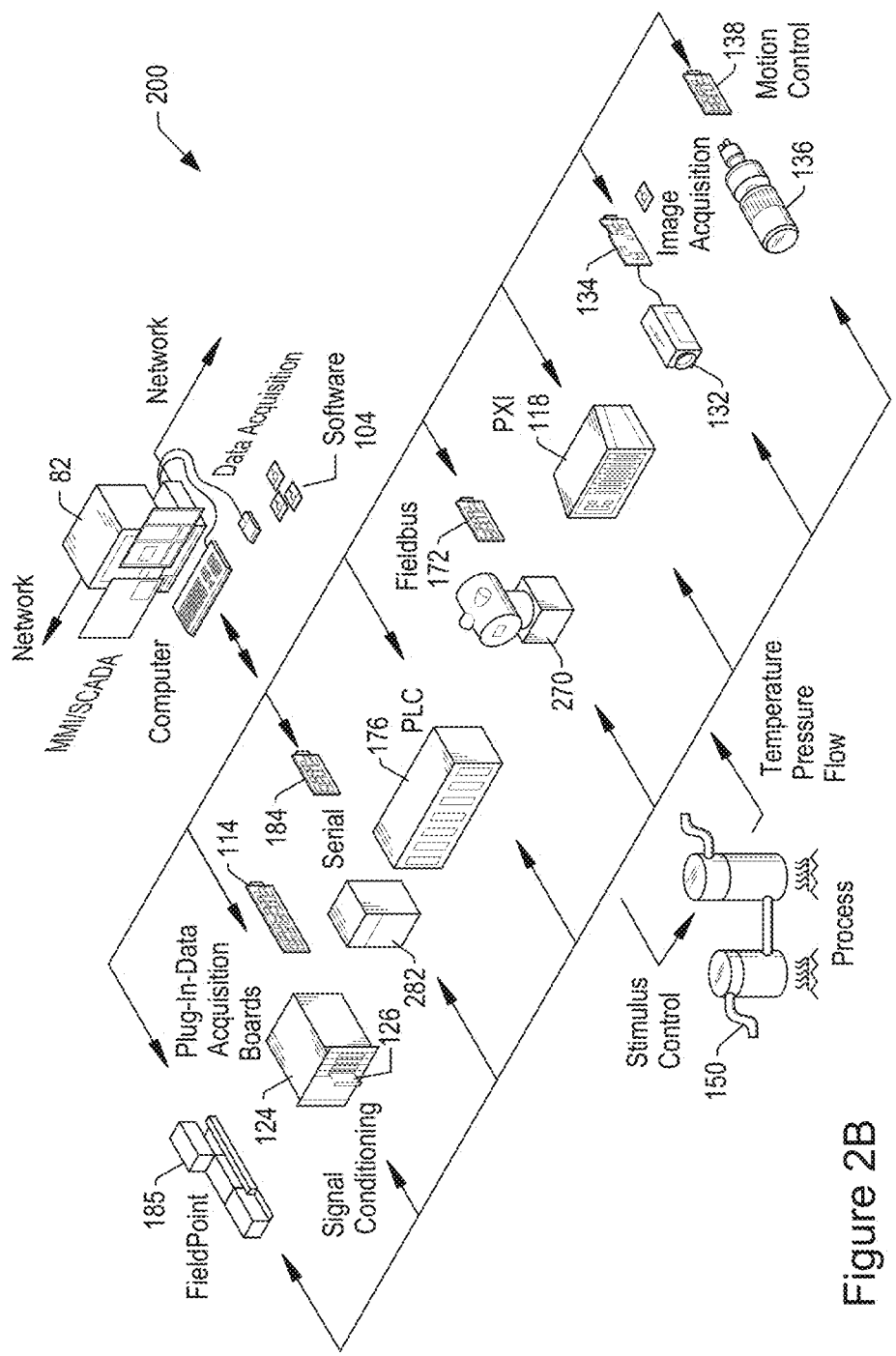
FIG. 2B illustrates an industrial automation system according to one embodiment of the invention.

FIG. 2B illustrates an exemplary industrial automation system 200 which may implement embodiments of the invention. The industrial automation system 200 is similar to the instrumentation or test and measurement system 100 shown in FIG. 2A. Elements which are similar or identical to elements in FIG. 2A have the same reference numerals for convenience. The system 200 may comprise a computer 82 which couples to one or more devices or instruments. The computer 82 may comprise a CPU, a display screen, memory, and one or more input devices such as a mouse or keyboard as shown. The computer 82 may operate with the one or more devices to perform an automation function with respect to a process or device 150, such as MMI (Man Machine Interface), SCADA (Supervisory Control and Data Acquisition), portable or distributed data acquisition, process control, advanced analysis, or other control, among others, e.g., via execution of software 104.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 270 and associated fieldbus interface card 172, a PLC (Programmable Logic Controller) 176, a serial instrument 282 and associated serial interface card 184, or a distributed data acquisition system, such as Fieldpoint system 185, available from National Instruments Corporation, among other types of devices.

Figure 3A:
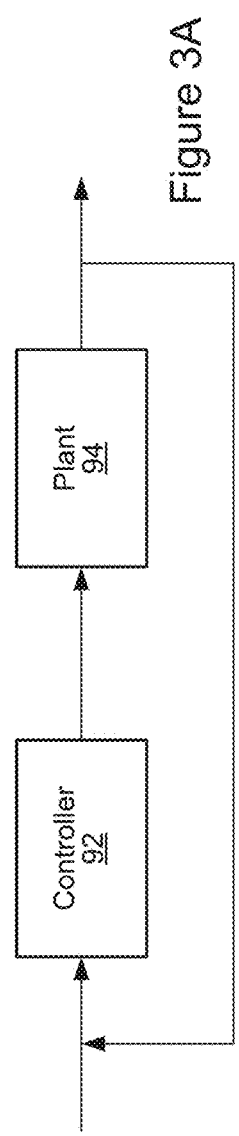
FIG. 3A is a high level block diagram of an exemplary system which may execute or utilize graphical programs.

FIG. 3A is a high level block diagram of an exemplary system which may execute or utilize graphical programs. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92.

Figure 3B:
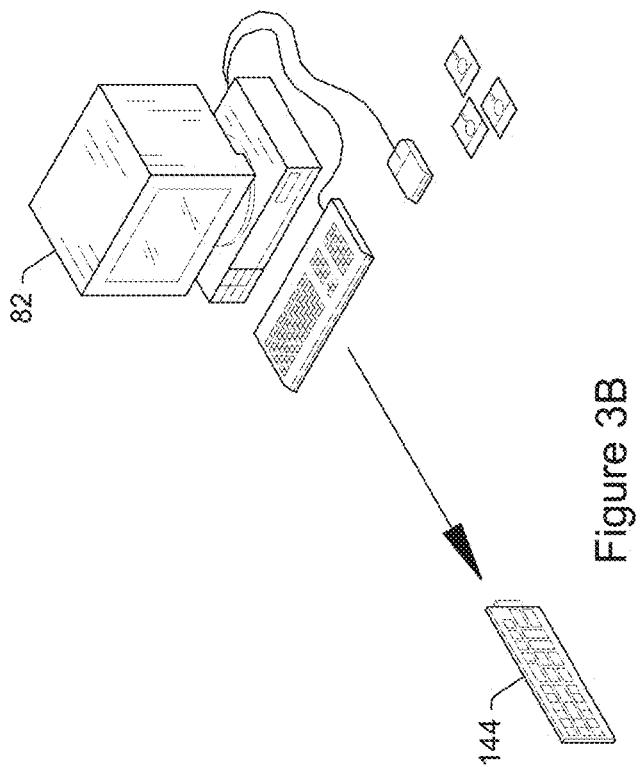
FIG. 3B illustrates an exemplary system which may perform control and/or simulation functions utilizing graphical programs.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a graphical program. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In one embodiment of the invention, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming or configuration using a graphical program. Thus the user may create a graphical program on a computer and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

Figure 4:
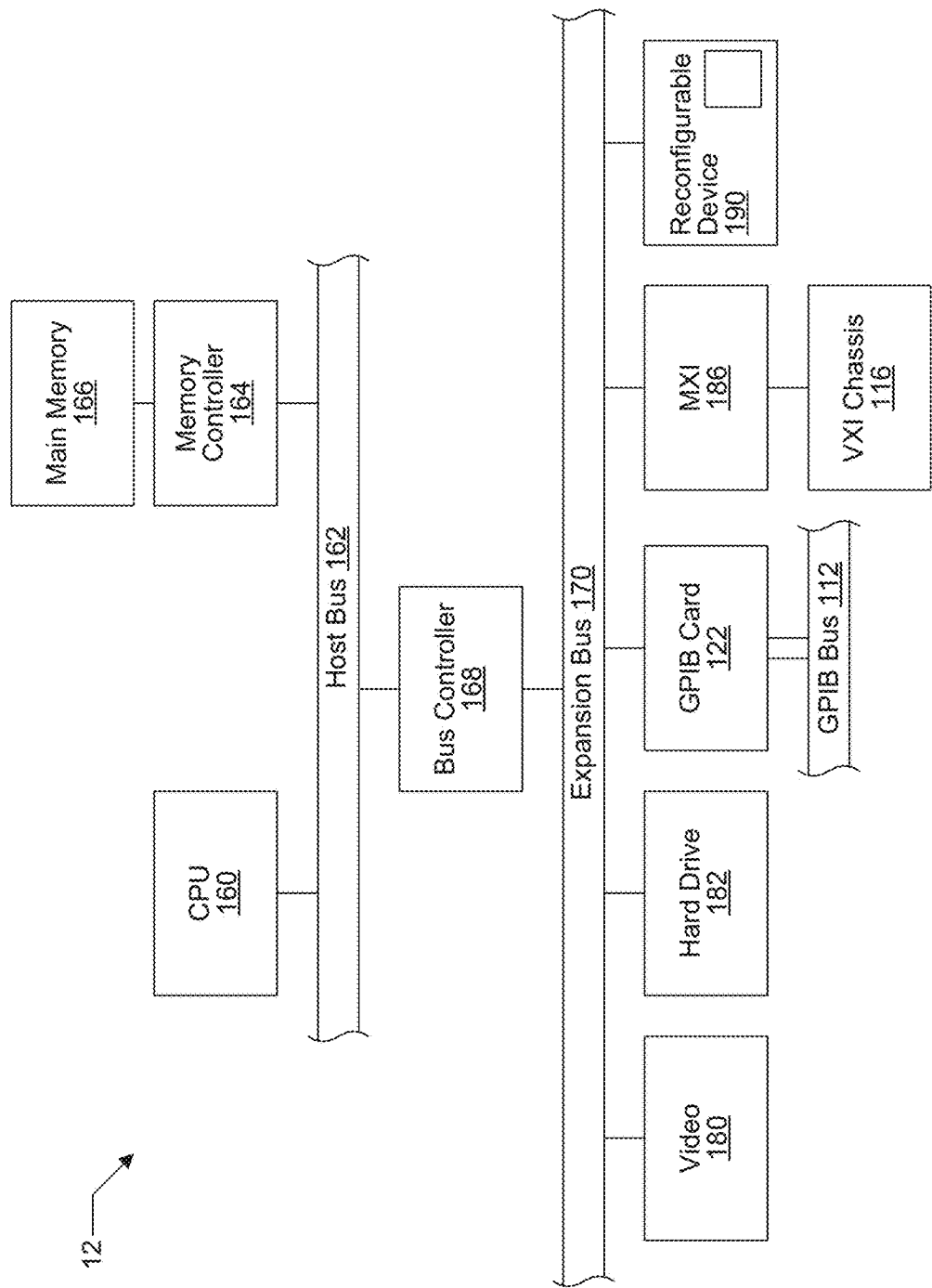
FIG. 4 is an exemplary block diagram of the computer systems of FIGS. 1A, 1B, 2A and 2B and 3B.

FIG. 4—Computer System Block Diagram

FIG. 4 is a block diagram 12 representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store one or more programs configured to perform convergence analysis on program variables, according to the present techniques. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170. The computer 82 may also comprise a GPIB card 122 coupled to a GPIB bus 112, and/or an MXI device 186 coupled to a VXI chassis 116.

As shown, a device 190 may also be connected to the computer. The device 190 may include a processor and memory which may execute a real time operating system. The device 190 may also or instead comprise a programmable hardware element. The computer system may be configured to deploy a graphical program to the device 190 for execution of the graphical program on the device 190. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

Figure 5:
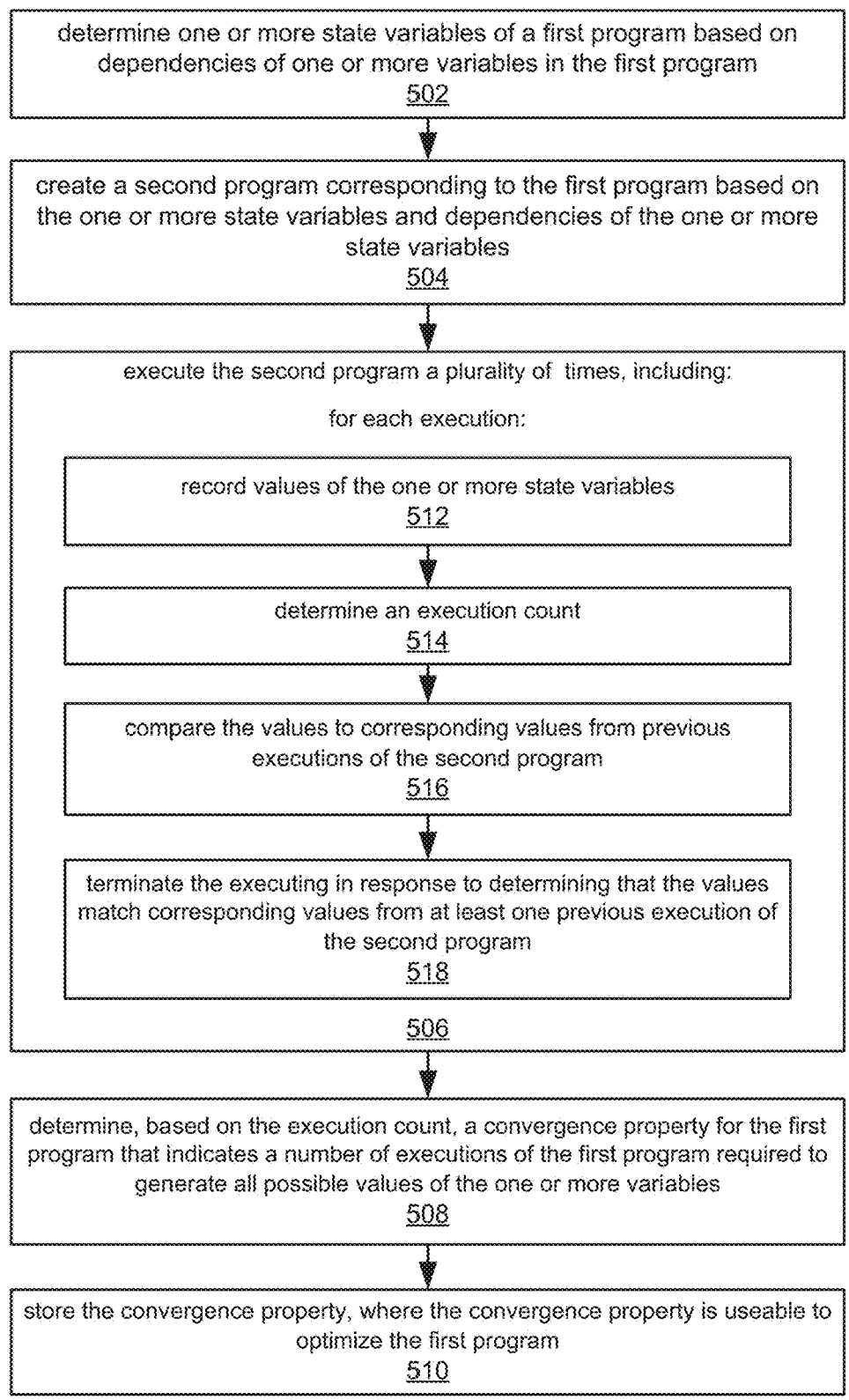
FIG. 5 is a flowchart diagram illustrating one embodiment of a method for convergence analysis of program variables.

FIG. 5—Flowchart of a Method for Convergence Analysis of Program Variables

FIG. 5 illustrates a method for performing convergence analysis of program variables. The method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 502, one or more state variables of a first program may be determined based on dependencies of one or more variables in the first program. As used herein, the term "state variable" refers to variables that carry (e.g., preserve or maintain) state from one call of a program to another call of the program. Thus, for example, in the C programming language these are global and static variables; in the LabVIEW™ graphical programming system (i.e., the G programming language) state variables include "feedback" and "feed forward" nodes; and in hardware, state variables are memories. Note that "feedback variables" (or nodes) are those variables that are dependent on themselves, i.e., that are dependent upon previous values of themselves, e.g., $x=x+1$, or more generally, $\{x,y\}=$(or :=, meaning "is assigned") function(x, y), where x and y are variables that (somehow) depend on one another.

Thus, state variables are different from normal variables in that their "lifetime" is longer than a single execution of the program in which they are used.

The first program may be any of a variety of program types, e.g., one or more of: a data flow program, a graphical program, a graphical data flow program, or a hardware description program, among others. As further examples, in some embodiments, the first program may be or include one or more of: a procedural program, a functional program, a textual program, or a declarative program.

Additionally, it should be noted that the one or more variables upon whose dependencies the state variables are (at least partially) determined may be of various kinds. For example, the one or more variables may include one or more of: at least one variable in at least one array indexing expression for an array in the first program, at least one set of variables that is dependent upon itself, or at least one variable whose value is set by an operation that includes input or output range properties to be optimized. In various embodiments, the one or more variables may have data types including one or more of: scalar, array, or heterogeneous data structure (i.e., with elements of different data types), which may also be referred to as a cluster.

The dependencies (of the one or more variables) may include one or more of: a data dependency through variable assignment, a control dependency through control structures, or a transitive closure of a data or control dependency, among others. The one or more state variables may include one or more of: at least one static variable, at least one global variable, at least one feedback node in a dataflow language, at least one modal parameter, or at least one parameter that takes on one of a plurality of values throughout execution of the first program.

Thus, a wide variety of first programs, variables, dependencies, and state variables are contemplated.

In 504, a second program corresponding to the first program may be created based on the one or more state variables and dependencies of the one or more state variables. In various embodiments, the second program may have any of a variety of forms (or combinations of such forms). For example, in one embodiment, the second program may be smaller than the first program. In another embodiment, the second program may be a program that executes faster than the first program. In a further embodiment, the second program may be an empty program with no state variables. In a yet further embodiment, the second program may be the same as the first program. More generally, the second program may be or include one or more of: smaller than the first program, a program that executes faster than the first program, an empty program with no state variables, or the same as the first program.

In 506, the second program may be executed a plurality of times. As FIG. 5 indicates, for each execution, the method may perform: recording values of the one or more state variables, as shown in 512, determining an execution count, as per 514, comparing the values to corresponding values from previous executions of the second program, as indicated in 516, and terminating said executing in response to determining that the values match corresponding values from at least one previous execution of the second program, per 518. Note that in some embodiments, a stopping condition, e.g., an execution count threshold or other stopping condition may be specified, and if matching values are not found before the stopping condition obtains, the iterative executions may terminate with a null result (and the method may indicate this null result to the user, e.g., on the display, in a log file, etc.).

Recording values of the one or more state variables may include one or more of: collecting unique values assigned to each variable, or collecting one or more derivative properties for values assigned to each variable, e.g., storing maximum and/or minimum value so far, average values, variance, etc.

In one embodiment, the determining one or more state variables (502), the creating (504), and the executing (506) may be performed as part of compiling the first program. Moreover, in various embodiments, where executing the second program (506) may include one or more of: running compiled code on a computer, where the compiled code is generated from at least a portion of the second program, interpreting program statements of at least a portion of the second program, or evaluating operations in a graph generated from at least a portion of the second program.

As FIG. 5 also shows, in 508, the method may determine, based on the execution count, a convergence property for the first program that indicates a number of executions of the first program required to generate all possible values of the one or more variables, and in 510, the convergence property may be stored. The convergence property may then be useable to optimize the first program, as discussed in more detail below.

The convergence property may be of any of a variety of forms, including, but not limited to, one or more of: a finite integer value, a real value, indicating a fractional execution of the program, an indication that there is no convergence, or a convergence property for each variable of at least a subset of variables in the first program (e.g., a set of convergence properties).

In one embodiment, the method may further include compiling the first program based on the convergence property, where the compiling includes generating code configured to run on one or more of: a desktop computer with one or more central processing unit (CPU) cores, an embedded computer with one or more CPU cores, a graphics processing unit (GPU), an embedded GPU, a field programmable gate array (FPGA), or an application specific integrated circuit (ASIC). Thus, any of a variety of execution platforms may be used as desired.

In some embodiments, the method may further include optimizing the first program based on the convergence property. Such optimizing may include, but is not limited to, one or more of: constant propagation and folding, range propagation and minimization, array size inference, dead code elimination, loop transformations, array transformations, memory optimization, inserting assertions (e.g., assumptions, or properties for testing purposes), inserting code coverage instrumentation, loop unrolling, in-lining of subprograms, out-lining of portions of programs, data type propagation and refinement, float to fixed data type conversion, optimization of overflow/quantization operations, type conversion insertion, or converting to look-up table implementations, among others.

Further details and exemplary embodiments are presented below.

Exemplary First Program (Textual)

Consider an exemplary first program that has multiple variables, for example, a, b, c, d, some "state variables", for example, x, y, z, as well as some inputs, e.g., i1, i2, and output, e.g., o1:

```
static int x := 0;      // state variable x, y, z initialized to 0
static int y := 0;
static int z := 0;
first program (input:i1, input:i2, output:o1)
{
    int a, b, c, d;
    a := x + 1;
    b := i1 + z;
    c := i2 + z;
    d := y;
    o1 := a + b + c + d;
    x := x + y;
    y := y + 1;
    z := z - 1;
}
```

Now, consider, for example, analyzing the history of variable "a" for all executions of the program. First, note that the dependency of variable "a" includes the state variable "x" (because a:=x+1). As explained above, the dependency of a variable is the set of variables used to calculate the variable.

Note that the state variable x is in turn dependent on state variables x and y (because x:=x+y), and so, to analyze history of "a", the method ascertains its dependent state variables, in this case "x", and all state variables it/they depend on, in this case, "x and y". The convergence property can be determined from this final set of state variables "x and y", and so in this example, state variable z, and other variables a, b, c, d, can be excluded from the convergence analysis.

In the above example, the "portion of program extracted from state variables and their dependencies" would be (assuming the state variables are x and y):

$$x:=x+y;$$

$$y:=y+1;$$

This is an exemplary example of the "smaller program" case mentioned above based on this analysis of variable "a". Note that this example (much smaller program) illustrates a particularly beneficial aspect of one embodiment of the present techniques; that to analyze the convergence for variable "a", it may be sufficient to extract and analyze only this (usually much smaller) second program.

Note that the above-mentioned special case where the second program (extracted from the first program) is an "empty program" occurs when there are no state variables, in which case, the set of state variables that a variable depends on is empty, and so the "second program" that is extracted from the first program is empty—no state variable, no assignments to state variables, etc., and thus the second program is really no program at all. This case may be detected by the method (no state variables found), and accordingly, the convergence number (or property) may be 1. In other words, any program without dependency on state variables may have a convergence number or property of 1.

Alternatively, in the case where all variables in a program are state variables, the second program may be identical to the original program.

Figure 6:
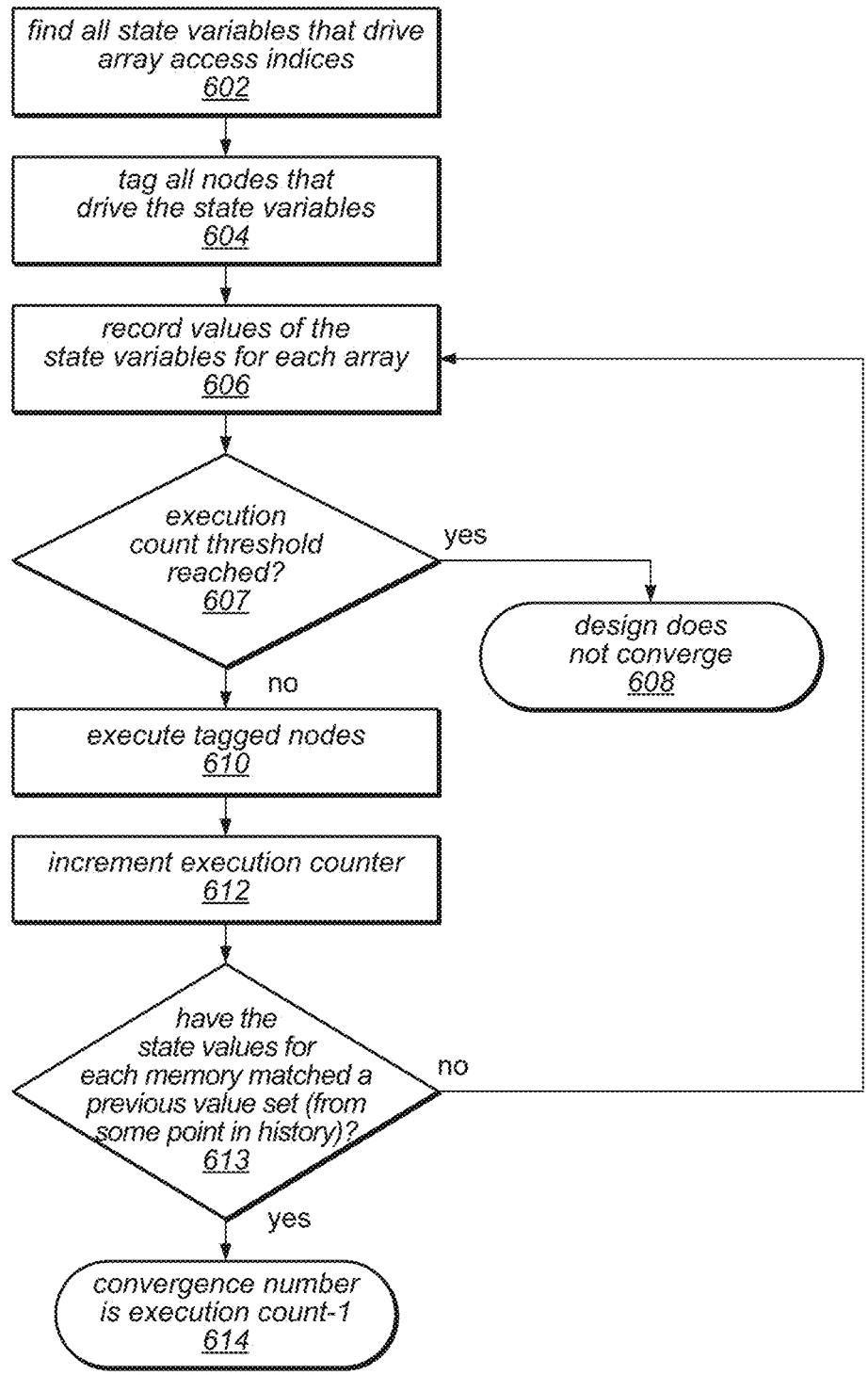
FIG. 6 is a flowchart diagram of an exemplary embodiment of the method of FIG. 5.

FIG. 6—Flowchart of Another Method for Convergence Analysis of Graphical Program Variables FIG. 6 illustrates a method for performing convergence analysis of program variables in a graphical program, according to one embodiment, and may be considered an exemplary embodiment or variation of the method of FIG. 5. The method shown in FIG. 6 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

Figure 7A:
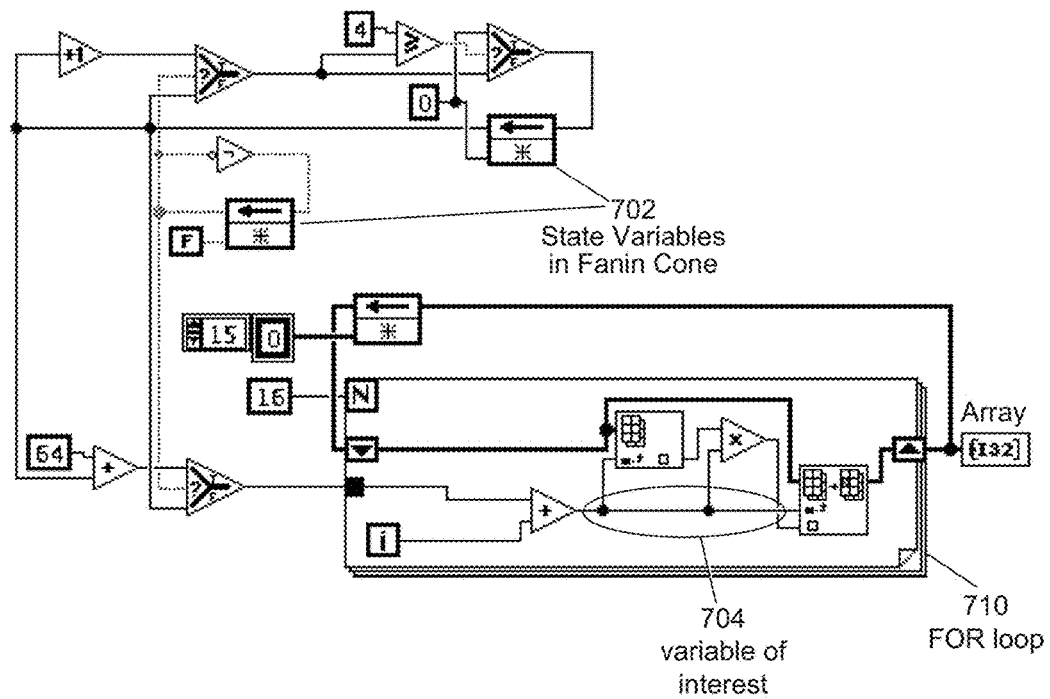
FIGS. 7A and 7B respectively illustrate an exemplary graphical first program, and an exemplary graphical second program, according to one embodiment.

In 602, all state variables that drive array access indices in a graphical first program may be determined (or found/identified), e.g., for each array in the program. FIG. 7A illustrates an exemplary graphical first program, according to one embodiment. Note that graphical program elements that are not particularly relevant to the present techniques are not described. Note further that in such graphical programs, variables, which are the means by which data are transferred, may be represented (or implemented) by "wires" that connect (graphical program) nodes and terminals.

In 604, all graphical program nodes that drive the state variables (of 602) may be tagged (via any tagging techniques desired, including direct and indirect tagging approaches). In other words, the nodes (graphical program logic) that form the fanin cone for array access indices may be tagged in some manner. As may be seen, the exemplary graphical first program of FIG. 7A includes state variables 702, which, as shown, are in a fanin cone for the graphical program. As those of skill know, a fanin cone refers to logic or program code that drives an input, pin, or port.

As also shown, the exemplary first program further includes a FOR loop 710, configured to process input data using one or more variables of interest 704, indicated by the oval inside the FOR loop. The FOR loop (of loop max=16) iteratively reads a location (i+offset) from a memory, multiplies the read value by (i+offset), and then writes back to the same location (i+offset). Note that the memory is initialized to contain all 0's initially. The offset is calculated by the logic outside the FOR loop. This logic contains two feedback registers which retain their values between successive calls of the program. Therefore, successive calls of this program will update different sets of 16 locations of the array.

Now, consider analyzing the read and write addresses of the array, where all of the possible values for (i+offset) this program will actually execute needs to be determined, which leads to the question, how many times must this program be executed to discover/determine all possible values for (i+offset)? This data element or variable "i+offset" is labeled in FIG. 7A as "variable of interest 704. In other words, the convergence number for this program for the variable "i+offset" needs to be determined. Now, analyzing the fanin cone of the variable "i+offset", the state variables in the two feedback nodes, labeled "state variables in fanin cone", may be determined (found).

Thus, the exemplary graphical first program includes state variables and at least one variable of interest.

Figure 7B:
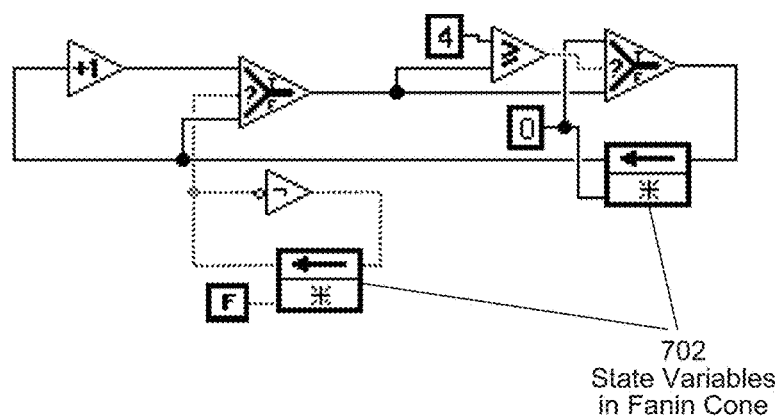

In 606, values of the state variables for each array may be recorded. For example, the tagged nodes of 604 may be used to compose or create a graphical second program (e.g., as per 504 of FIG. 5), which may then be executed (e.g., as per 506 of FIG. 5) to generate the values of the state variables. Prior to the first execution of the graphical second program, these state variables may have or be given initial values. FIG. 7B illustrates an exemplary graphical second program generated based on dependencies and state variables of the graphical first program of FIG. 7A, where the graphical second program corresponds to the state variables and their assignments/dependencies of the first program. This second program may be used to determine the convergence number of the first program. Note the inclusion of the state variables in the fanin cone 702 of the graphical first program of FIG. 7A (and conversely, the omission of other elements not germane to the values of the state variables, including the FOR loop 710 and variable of interest 704, which may substantially speed the execution of the second program, and thus provide a quick way to determine the convergence number or property.

In 607, a determination may be made as to whether a specified execution count threshold has been reached. If the execution count threshold has been reached, the program (or program design) does not converge, as indicated in 608, and in some embodiments, a null or negative result may be returned, e.g., for display to the user. Conversely, if the specified execution count threshold has not been reached, then in 610, the tagged nodes (from 604) may be executed, and in 612, the execution count may be incremented.

In 613, a determination may be made as to whether state values for each memory matched a value set recorded in a previous iteration, i.e., from some point in the execution history. If a match is not determined in 613, the method may return to method element 606, as shown, and may proceed as described above, recording the current (most recent) values of the state variables, per 606, and so forth. On the other hand, if a match is determined in 613, then in 614, a convergence property (e.g., convergence number) may be determined (and stored). For example, in the embodiment shown, the convergence number/property may be the current execution count minus 1 (execution count−1), although other forms of the convergence property are also contemplated, as noted above.

Describing the above in a different way, in one exemplary embodiment, given a set of variables in a first program, its convergence number may be determined by extracting state variables based on the dependency of the program variables, and a second (e.g., smaller) program may be generated based on the state variables and dependency. The second program may be executed multiple times in an iterative manner, and values of the state variables recorded (each execution) until a variable/value configuration is found that has been previously recorded. The number of this execution (possibly minus 1, depending on the counting approach) may be returned or stored as the convergence number for the graphical first program (and the graphical second program, as well).

Note that the convergence property (or number) is thus generated without having to execute the entire first program, which may provide significant savings in time and/or execution resources.

Thus, various embodiments of the above techniques may provide for rapid convergence analysis of programs.

Creating a Graphical Program

As noted above, in some embodiments, the programs implementing the techniques disclosed herein and/or the programs to which the techniques are applied, may be graphical programs. The following describes various exemplary embodiments of graphical program creation.

A graphical program may be created on the computer system 82 (or on a different computer system). The graphical program may be created or assembled by the user arranging on a display a plurality of nodes or icons and then interconnecting the nodes to create the graphical program. In response to the user assembling the graphical program, data structures may be created and stored which represent the graphical program. The nodes may be interconnected in one or more of a data flow, control flow, or execution flow format. The graphical program may thus comprise a plurality of interconnected nodes or icons which visually indicates the functionality of the program. As noted above, the graphical program may comprise a block diagram and may also include a user interface portion or front panel portion. Where the graphical program includes a user interface portion, the user may optionally assemble the user interface on the display. As one example, the user may use the LabVIEW graphical programming development environment to create the graphical program.

In an alternate embodiment, the graphical program may be created by the user creating or specifying a prototype, followed by automatic or programmatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, as desired. The graphical program may implement a measurement function that is desired to be performed by the instrument.

In another embodiment, a graphical user interface or front panel for the graphical program may be created, e.g., in response to user input. The graphical user interface may be created in any of various ways, e.g., depending on the graphical programming development environment used.

A block diagram for the graphical program may be created. The block diagram may be created in or using any graphical programming development environment, such as LabVIEW, Simulink, VEE, or another graphical programming development environment. The block diagram may be created in response to direct user input, e.g., the user may create the block diagram by placing or "dragging and dropping" icons or nodes on the display and interconnecting the nodes in a desired fashion. Alternatively, the block diagram may be programmatically created from a program specification. The plurality of nodes in the block diagram may be interconnected to visually indicate functionality of the graphical program. The block diagram may have one or more of data flow, control flow, and/or execution flow representations.

It is noted that the graphical user interface and the block diagram may be created separately or together, in various orders, or in an interleaved manner. In one embodiment, the user interface elements in the graphical user interface or front panel may be specified or created, and terminals corresponding to the user interface elements may appear in the block diagram in response. For example, when the user places user interface elements in the graphical user interface or front panel, corresponding terminals may appear in the block diagram as nodes that may be connected to other nodes in the block diagram, e.g., to provide input to and/or display output from other nodes in the block diagram. In another embodiment, the user interface elements may be created in response to the block diagram. For example, the user may create the block diagram, wherein the block diagram includes terminal icons or nodes that indicate respective user interface elements. The graphical user interface or front panel may then be automatically (or manually) created based on the terminal icons or nodes in the block diagram. As another example, the graphical user interface elements may be comprised in the diagram.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer accessible memory medium that stores program instructions executable by a processor to implement:

initiating an analysis of a first program;

in response to initiating the analysis, determining, based on dependencies of one or more variables in the first program, one or more state variables of the first program;

creating, based on the one or more state variables and dependencies of the one or more state variables, a second program corresponding to the first program;

executing the second program a plurality of times, comprising:

for each execution:

recording values of the one or more state variables;

incrementing an execution count;

comparing the values to corresponding values from previous executions of the second program; and terminating said executing in response to determining that the values match corresponding values from at least one previous execution of the second program;

determining, based on the execution count, a convergence property for the first program that indicates a number of executions of the first program required to generate all possible values of the one or more variables, wherein the convergence property is useable to optimize the first program; and displaying the convergence property, wherein said executing the second program comprises one or more of:

running compiled code on a computer, wherein the compiled code is generated from at least a portion of the second program;

interpreting program statements of at least a portion of the second program; or evaluating operations in a graph generated from at least a portion of the second program.

2. The non-transitory computer accessible memory medium of claim 1, wherein the program instructions are further executable to implement:

optimizing the first program based on the convergence property, wherein said optimizing the first program comprises modifying code of the first program based on the convergence property.

3. The non-transitory computer accessible memory medium of claim 2, wherein said optimizing the first program comprises:

deleting code of the first program; and
adding new code to the first program.

4. The non-transitory computer accessible memory medium of claim 2, wherein said optimizing comprises:

in-lining of subprograms.

5. The non-transitory computer accessible memory medium of claim 2, wherein said optimizing comprises at least one of:

array size inference; or
array transformation.

6. The non-transitory computer accessible memory medium of claim 2, wherein said optimizing comprises:

dead code elimination.

7. The non-transitory computer accessible memory medium of claim 2, wherein said optimizing comprises at least one of:

loop transformations; or
loop unrolling.

8. The non-transitory computer accessible memory medium of claim 2, wherein said optimizing comprises:

memory optimization.

9. The non-transitory computer accessible memory medium of claim 1, wherein the first program comprises a first graphical program and the second program comprises a second graphical program, wherein each of the first graphical program and the second graphical program comprises a plurality of interconnected nodes that visually indicate functionality of the respective graphical program.

10. A computer-implemented method, the method comprising:

utilizing a computer to perform:

initiating an analysis of a first program;

in response to initiating the analysis, determining, based on dependencies of one or more variables in the first program, one or more state variables of the first program;

creating, based on the one or more state variables and dependencies of the one or more state variables, a second program corresponding to the first program;

executing the second program a plurality of times, comprising:

for each execution:

recording values of the one or more state variables;

incrementing an execution count;

comparing the values to corresponding values from previous executions of the second program; and terminating said executing in response to determining that the values match corresponding values from at least one previous execution of the second program;

determining, based on the execution count, a convergence property for the first program that indicates a number of executions of the first program required to generate all possible values of the one or more variables, wherein the convergence property is useable to optimize the first program; and displaying the convergence property, wherein said executing the second program comprises one or more of:

running compiled code on a computer, wherein the compiled code is generated from at least a portion of the second program;

interpreting program statements of at least a portion of the second program; or evaluating operations in a graph generated from at least a portion of the second program.

11. The computer-implemented method of claim 10, wherein the first program comprises a graphical program, wherein the graphical program comprises a plurality of interconnected nodes that visually indicate functionality of the graphical program.

12. The computer-implemented method of claim 10, wherein the method further comprises:

optimizing the first program based on the convergence property, wherein said optimizing the first program comprises modifying code of the first program based on the convergence property, wherein said modifying code of the first program comprises data type propagation and refinement.

13. The computer-implemented method of claim 10, wherein the method further comprises:

optimizing the first program based on the convergence property, wherein said optimizing the first program comprises modifying code of the first program based on the convergence property, wherein said modifying code of the first program comprises type conversion insertion.

14. An apparatus comprising a processor, wherein the apparatus is configured to implement:

initiating an analysis of a first program;

in response to initiating the analysis, determining, based on dependencies of one or more variables in the first program, one or more state variables of the first program;

creating, based on the one or more state variables and dependencies of the one or more state variables, a second program corresponding to the first program;

executing the second program a plurality of times, comprising:

for each execution:

recording values of the one or more state variables;

incrementing an execution count;

comparing the values to corresponding values from previous executions of the second program; and terminating said executing in response to determining that the values match corresponding values from at least one previous execution of the second program;

determining, based on the execution count, a convergence property for the first program that indicates a number of executions of the first program required to generate all possible values of the one or more variables, wherein the convergence property is useable to optimize the first program; and displaying the convergence property, wherein said executing the second program comprises one or more of:

running compiled code on a computer, wherein the compiled code is generated from at least a portion of the second program;

interpreting program statements of at least a portion of the second program; or evaluating operations in a graph generated from at least a portion of the second program.

15. The apparatus of claim 14, wherein the apparatus is further configured to implement:

optimizing the first program based on the convergence property, wherein said optimizing the first program comprises modifying code of the first program based on the convergence property.

16. The apparatus of claim 15, wherein said optimizing the first program comprises:

deleting code of the first program; and adding new code to the first program.

17. The apparatus of claim 15, wherein said optimizing comprises one or more of:

constant propagation and folding; or range propagation and minimization.

18. The apparatus of claim 15, wherein the second program comprises a graphical program, wherein the graphical program comprises a plurality of interconnected nodes that visually indicate functionality of the graphical program.

* * * * *

UNITED STATES PATENT AND TRADEMARK OFFICE
CERTIFICATE OF CORRECTION

PATENT NO. : 10,216,495 B2
APPLICATION NO. : 15/886390
DATED : February 26, 2019
INVENTOR(S) : Taylor L. Riche et al.

Page 1 of 1

It is certified that error appears in the above-identified patent and that said Letters Patent is hereby corrected as shown below:

On the Title Page

Page 2, Column 1, In Item (63) Related U.S. Application Data, Line 4:
Please delete "Aug. 25, 2014" and insert --Aug. 26, 2014--.

Signed and Sealed this
Fourteenth Day of April, 2020

Andrei Iancu
*Director of the United States Patent and Trademark Office*